(12) United States Patent
Wieczorek

(10) Patent No.: US 6,784,432 B2
(45) Date of Patent: Aug. 31, 2004

(54) X-RAY DETECTOR MODULE

(75) Inventor: Herfried Karl Wieczorek, Aachen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 321 days.

(21) Appl. No.: 09/994,359

(22) Filed: Nov. 26, 2001

(65) Prior Publication Data

US 2002/0079455 A1 Jun. 27, 2002

(30) Foreign Application Priority Data

Nov. 27, 2000 (DE) .......................................... 100 58 810

(51) Int. Cl.[7] .................................................. G01T 1/20
(52) U.S. Cl. ..................................................... 250/367
(58) Field of Search ........................................ 250/367

(56) References Cited

U.S. PATENT DOCUMENTS 4,375,423 A * 3/1983 Cusano et al. ........... 250/483.1
4,563,584 A * 1/1986 Hoffman et al. ............ 250/367
5,712,483 A * 1/1998 Boone et al. ................ 250/367
5,981,959 A    11/1999 Apte ....................... 250/483.1
6,534,772 B1 * 3/2003 Chhabra et al. ............ 250/367

FOREIGN PATENT DOCUMENTS

GB           2167279 A * 5/1986 ............. G01T/1/20

* cited by examiner

Primary Examiner—Constantine Hannaher
(74) Attorney, Agent, or Firm—John F. Vodopia

(57) ABSTRACT

An X-ray detector module (1) is provided, in which a preferably metallic carrier (3) forms tubular cells (4) in which there is provided a mixture of a binder (7) and scintillator particles (6). The absorption of X-rays by the scintillator particles (6) gives rise to the emission of light of a longer wavelength ($\lambda_1$, $\lambda_2$) that can be detected by a detector (5) arranged at the far end of the cells (4). In order to keep the light yield as high as possible, a difference of less than 20% is pursued between the refractive indices of the binder (7) and the scintillator particles (6) and/or nano-crystalline scintillator particles (6) of a size of between 1 and 100 nm are used. Preferably, the cell walls (3, 3') are extended in the direction of incidence of the X-rays in order to form an anti-scatter grid above the detector.

11 Claims, 2 Drawing Sheets

X-RAY DETECTOR MODULE

Figure 1:
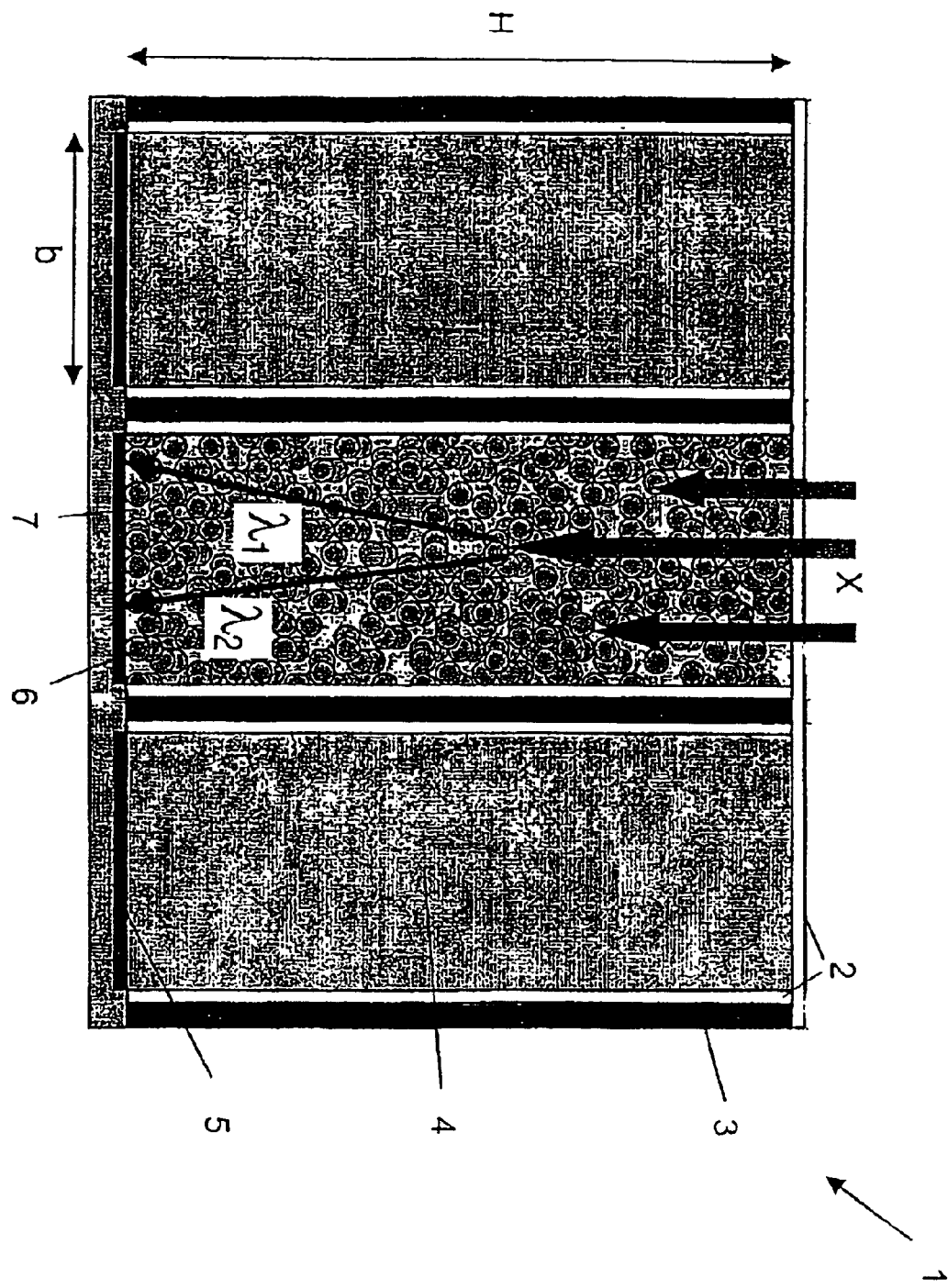

The invention relates to an X-ray detector module which includes a carrier that forms cells arranged in the form of a grid and is made of a material that is essentially non-transparent to X-rays. The invention also relates to a method of manufacturing such an X-ray detector module.

X-ray detectors that are used for medical applications and for non-destructive testing of materials generally are manufactured as structured X-ray absorbers and detectors that are associated with the individual pixels of the X-ray absorber. In X-ray absorbers the photons of the X-rays to be detected are absorbed by the scintillator material so as to be re-emitted in the form of visible or ultraviolet light. The photons of this light can then be detected in the detectors and spatially associated with the corresponding pixel of the X-ray absorber. The detectors may be, for example, photodiodes, avalanche diodes or photomultipliers.

Notably in the case of large-format X-ray detectors of the kind set forth, however, the manufacture of the detector field that is subdivided into pixels is very intricate. Depending on the relevant application, the surface area of such an X-ray detector may amount to between 100×3 cm$^2$ (computed tomography apparatus) or to 30×40 cm$^2$ (fluoroscopy, radiology). The size of the individual pixels is then in the range of from 0.03 to 30 mm$^2$. The number of pixels in each detector is in the range of from one thousand to several millions of pixels.

In the case of a small number of detector pixels it is possible in principle to construct the detector from individual scintillator crystals that act as X-ray absorbers and absorber plates that are provided between the crystals. The absorber plates serve to structure the X-ray detector in individual cells and to prevent optical cross-talk and cross-talk between the cells due to X-ray fluorescence quanta. The cells that are defined by the absorber plates thus define the size of a pixel in the X-ray detector module.

Up to an order of magnitude of some thousands of pixels it is in principle possible to manufacture structured scintillator crystals by cutting large wafers from scintillator crystals and by combining the individual scintillator rods alternately with absorber materials such as, for example, reflecting coated metal foils, so as to form one-dimensionally structured arrays. Two-dimensional structuring is also possible in this manner, be it that a second manufacturing step is then required. The manufacture of such arrays, therefore, is very prone to faults and very expensive. Therefore, this method cannot be used in a practical situation involving a large number of individual pixels of a size that is less than 1 mm.

U.S. Pat. No. 5,981,959 discloses an X-ray detector module in which a special shape is imparted to a mixture of a binder, a solvent and scintillator particles by means of a molding technique, thus forming columns of scintillator material that extend at right angles from a base surface of the material. After absorption of an X-ray quantum in such a column, one or more light quanta of a longer wavelength are isotropically emitted, many of said quanta being conducted, by reflection on the wall of the column, in the direction of a detector element that is associated with the column and in which the quanta are detected. However, considerable deflection and scattering of the light quantum may occur along the path from the column of the scintillator material to the detector element, so that the quantum can be assigned to its origin in space with a poor accuracy only. Furthermore, the manufacture of such detector modules is very intricate and hence expensive because of the complex etching or other methods of forming the columns of the scintillator material.

Considering the foregoing it is an object of the invention to provide an X-ray detector module that can be economically manufactured and enables detection of the X-rays with a suitable spatial resolution.

This object is achieved by means of an X-ray detector module as disclosed in the characterizing part of the claims 1, 2 and/or 11, as well as by means of a method as disclosed in the characterizing part of the claim 12. Advantageous embodiments are disclosed in the dependent claims.

The X-ray detector module thus includes a carrier which forms cells that are arranged in the form of a grid and is made of a material that is essentially non-transparent to X-rays. The cells are adjacently arranged in a row or in several rows and form a one-dimensional or two-dimensional structure of the X-ray detector module. The cells contain a mass that contains a binder in which scintillator particles are embedded, the scintillator particles emitting light in the range of a longer wavelength $\lambda$ after absorption of an X-ray quantum.

In a first embodiment of the X-ray detector module in accordance with the invention the materials for the binder and for the scintillator particles are chosen to be such that the difference between the optical refractive index $n_s$ ($\lambda$) of the scintillator particles for the wavelength X and the optical refractive index $n_B$ ($\lambda$) of the binder for the wavelength X amounts to less than 20% and preferably less than 10%. Preferably, the refractive indices of the scintillator particles and the binder are essentially the same.

An X-ray detector module of this kind can be economically manufactured and at the same time enables high resolutions to be achieved, that is, smaller pixel sizes. This is possible because of the use of a powder of scintillator particles or of a scintillator liquid whereby the cells that are formed in a carrier can be simply filled. Therefore, it is no longer necessary to cut scintillator crystals into small parts and to enclose such parts individually with an absorber wall. However, it is to be noted that the scintillator particles are capable of scattering the re-emitted light photons, leading to multiple reflection and partial absorption at the scintillator crystals and at the walls of the cell, and hence to erasure of the signal, that is, notably in the case of large slice thicknesses of the scintillator mass. These problems are solved in the described X-ray detector module by limiting the difference between the refractive indices of the scintillator particles and the binder to a maximum of 20%. It has been found that when this limit is observed, said disturbing effects can be kept sufficiently small. The smaller the difference between the refractive indices, the smaller the disturbing effects and the higher the signals of the X-ray detector module can be.

The binder preferably contains a TiO$_2$ component which is present notably in the form of rutile or anatase and/or a component of ZnO, ZnS, ZrO$_2$, BaSO$_4$ and/or PbCO$_3$. The percentage of these substances in the binder material preferably amounts from 50% by weight to 95% by weight. Said substances make it possible to select an organic substance, such as notably a polymer, as the basic substance for the binder and to adjust the refractive index of the resultant mixture (by choosing correspondingly large percentages of the additives such as, for example, of TiO$_2$), to be so high that it is as near as possible to the refractive index of the scintillator particles.

In a further embodiment of the X-ray detector module in accordance with the invention, including a carrier that forms cells and a mixture of a binder and scintillator particles that is provided in the cells as described above, the scintillator particles have a grain size of less than 200 nm but preferably less than 100 nm, and in particular preferably less than 50 nm. The grain size of the scintillator particles may notably between 1 and 50 nm. In that case the scintillator particles are so-called nano-particles. The use of such nano-particles makes it possible to keep the disturbing scattering of re-emitted light photons in the scintillator mass of the cells to be kept so small that a suitable signal level is obtained for the X-ray detector module, despite a large layer thickness of the scintillator mass.

It is notably advantageous when the difference between the refractive indices between the nano crystalline scintillator powder and the surrounding binder is less than 20%, notably less than 10%. In that case the small size of the scintillator particles and the small difference between the refractive indices both contribute to a reduction of the disturbing effects.

The carrier that forms the cells of the X-ray detector modules preferably consists of a metal, of a synthetic material that is filled with a metal and/or of glass that can be photostructured. Such a glass is a type of glass whereto a desired three-dimensional structure can be imparted by exposure and etching methods. Such processes can notably provide the carrier with the cells of the X-ray detector module. When the carrier contains a metal or is made of metal, it has the desired reflection and absorption properties for the re-emitted light. A carrier that is made of such a material notably prevents optical cross-talk and cross-talk due to X-ray fluorescent quanta.

The surfaces of the carrier can be provided at least partly with a reflector layer which has a degree of reflection of more than 90%, that is, preferably more than 97% for light in the range of the wavelength $\lambda$. Notably the surfaces of the carrier that form the cell walls should be provided with such a reflector layer so as to ensure that the light that is generated in the scintillator mass is reflected at the walls of the cells and hence is not lost to the detection process. The reflector layer preferably consists of a white powder that contains $TiO_2$ and has a layer thickness of typically from 10 to 50 $\mu$m. A vapor-deposited metal layer of, for example, silver Ag, aluminum Al or the like can be used alternatively or additionally. The latter is advantageous notably in the case of structured glass.

In a preferred embodiment of the invention the volume of the scintillator particles amounts to from approximately 50% to 70% of the volume of the mass of binder and scintillator particles that is deposited in the cells. The layer thickness of said mass preferably amounts to from 0.1 to 5 mm in dependence on the relevant application. The layer thickness is then measured in the direction of the incident X-rays.

The cells of the carrier of the X-ray detector module may have different shapes that follow from the desired absorption and emission behavior as well as from the manufacturing process used. Preferably, the cells have an elongate shape in the direction of the incident X-rays; this means that the width of the cells as measured in the direction transversely of the incident X-rays or transversely of the plane in which the cells are arranged is smaller than the height of the cells that is measured in the direction of the incident X-rays.

The width of the cells may notably amount to from 10 to 50% and preferably to about a third of the height.

Rare earth oxide or oxisulphides with praseodymium Pr, cerium Ce, terbium Tb and/or europium Eu are suitable doping materials for the scintillator particles, notably $Gd_2O_2S:Pr$, $Gd_2(SO_4)O:Ce$ (GOS, GSO). The rare earth metals also include scandium Sc, yttrium Y, lanthanum La and the lanthanides. Furthermore, alkali halides such as CsI:Tl, CsI:Na or NaI:Tl and/or $CdWO_4$ are also suitable materials for the scintillator particles.

The radiation that is emitted in the range of visible light after the absorption of an X-ray quantum can be detected by appropriate detectors, thus enabling indirect detection of the X-ray quantum and its localization. To this end, to one side of at least one cell there may be provided a detector for converting photons from the range of the wavelength $\lambda$ into an electrical signal. The detector may notably form part of a CMOS chip or an a-Si:H detector. Preferably, a detector that can be separately electronically read out is associated with each cell of the X-ray detector module.

The invention also relates to an X-ray detector module that can be configured notably in one of the ways described above and is provided with a carrier that forms cells that are arranged in the form of a grid and is made of a material that is essentially non-transparent to X-rays. The cells are constructed so as to have a tubular shape and a sub-volume of the cells contains a scintillator material. A "tubular shape" of a cell is to be understood to mean that the side walls of the cells extend in parallel in one direction, so that the cell is open when viewed from this direction. The cross-sectional area of the cells may have a quasi arbitrary shape, be it that it is preferably compact and round or polygonal. Because only a sub-volume of the cells contains a scintillator material, a shielding effect is realized; the parallel side walls of the cells that project above the scintillator material thus act as an anti-scatter grid (ASG). This means that X-rays that are incident at an angle relative to the direction of the side walls will very likely be incident on the side walls of the carrier in which they are absorbed before reaching the scintillator material. Only X-rays that are incident substantially parallel to the axis of the cells will be incident on the scintillator material. Alignment of the axes of the cells relative to the source of the X-rays, therefore, can thus ensure that essentially only direct X-rays are detected in the scintillator material, since secondary X-rays that result from a scattering process are incident mainly at an oblique angle and hence are eliminated by absorption beforehand by the walls of the cells. An X-ray detector module of this kind combines the functions of a detector structure and an anti-scatter grid, the exact association in space of the scintillator and the anti-scatter grid being ensured in each construction.

The invention also relates to a method of manufacturing an X-ray detector module in conformity with the embodiments described above where a free-flowing mixture of a binder and scintillator particles is deposited in the prepared cells of a carrier by way of a wet chemical coating method. Subsequently, the mixture is cured and densified by thermal treatment, by UV irradiation and by similar processes. The steps of depositing the mixture and the densification can be repeated as often as necessary so as to achieve a desirable layer thickness. When the temperatures are kept sufficiently low during the process, the wet chemical deposition can take place directly on the detector substrate that is situated underneath the carrier (for example, CMOS chip or an a-Si—H detector).

The invention will be described in detail hereinafter, by way of example, with reference to the Figures.

Figure 2:
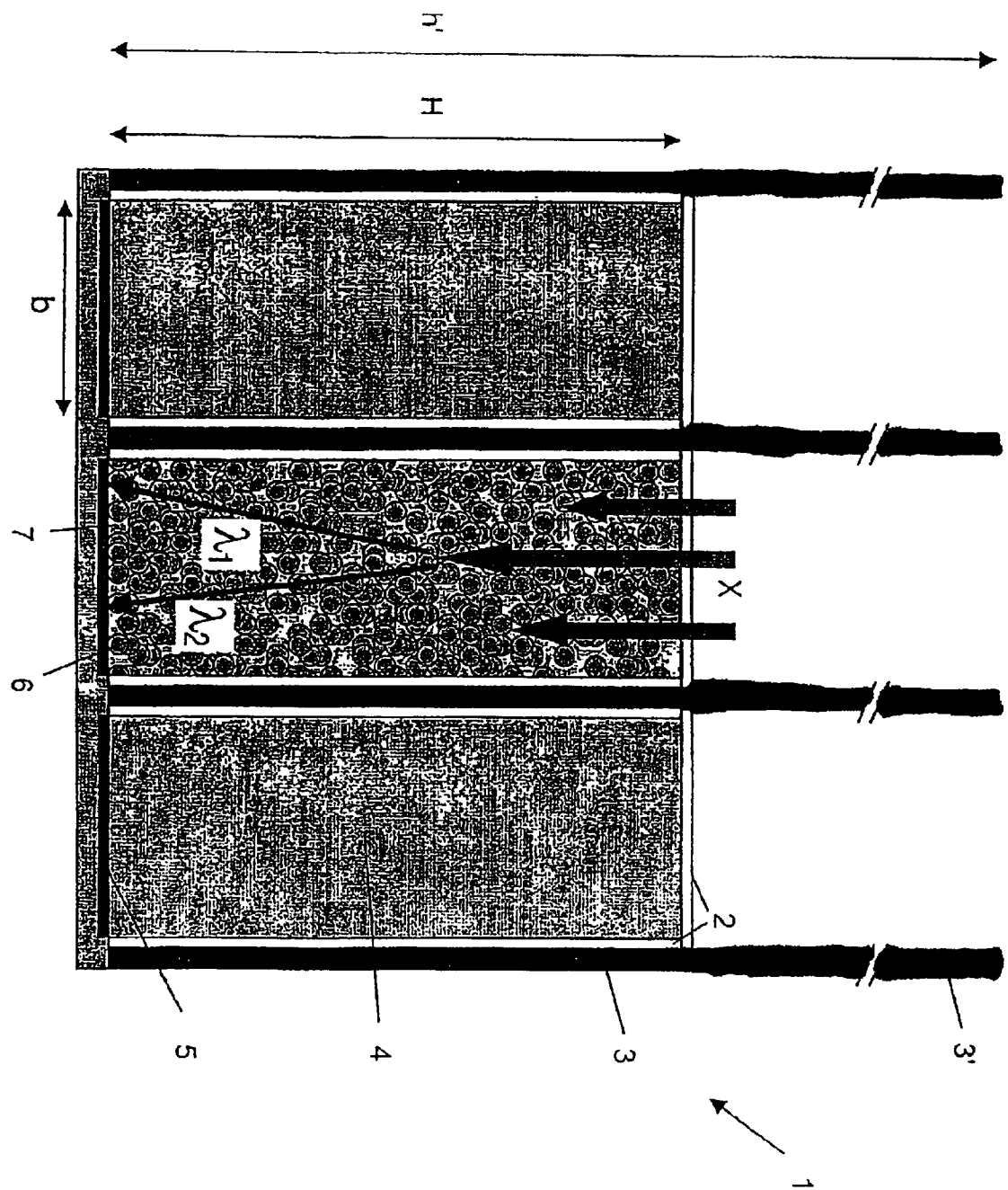

FIG. 1 is a diagrammatic cross-sectional view of three representative cells of an X-ray detector module in accordance with the invention; and FIG. 2 is a diagrammatic cross-sectional view of an alternate embodiment of the present invention showing three representative cells of an X-ray detector module in accordance with the invention.

Referring to FIG. 1, the X-ray detector module 1 is formed by cells 4 that are arranged in a grid structure. The grid structure is formed by way of a carrier which comprises vertical cell walls 3 (as viewed in the Figure) that separate the individual cells 4 from one another. The cells 4 have a column-like or tube-like appearance with a round or preferably a polygonal, notably a rectangular cross-section, the height h of the cells amounting to approximately three times the width b of the cells. Within the cells 4 there is provided a matrix that consists of a binder 7 and scintillator particles 6 that are embedded therein and are graphically represented by spheres in the central cell in the figure.

During use the X-ray detector module 1 is arranged relative to the direction of incidence (extending vertically from the top to the bottom in the Figure) of the X-rays to be detected in such a manner that the field (array) formed by the cells 4 extends transversely of this direction of incidence of the rays X. The X-rays X (heavy arrows) can thus enter the interior of the cells via the upper, open end face of the tubular cells 4. The X-ray quanta are absorbed by the scintillator particles 6 therein. After absorption of an X-ray quantum, the scintillator material emits one or more photons (thin arrows) whose wavelengths $\lambda_1$, $\lambda_2$ are in the range of visible light. A part of this light reaches the detector 5 which is arranged at the lower end face of the cell 4 and in which the light produces an electrical signal. This signal is electronically detected in known manner and represents an indication of the absorption of the X-ray quantum X in the associated cell of the X-ray detector module.

In order to ensure that an as large as possible part of the re-emitted light of the wavelengths $\lambda$ reaches the detector 5, the inner surfaces of the walls 3 of the carrier and the surfaces of the X-ray detector module 1 which face the detectors 5 are coated with a reflection layer 2. The reflection layer preferably consists of a powder that contains $TiO_2$ and has a layer thickness of from approximately 10 to 50 $\mu$m. The carrier 3 preferably consists of a metal and the scintillator particles 6 preferably consist of GOS ($Gd_2O_2S$:Pr).

The re-emitted light of the wavelengths $\lambda$ is subject to scatter processes at the scintillator particles 6 during its travel within the cell 4. In order to minimize such scattering processes, the materials of the binder 7 and the scintillator particles 6 are chosen to be such that the difference between their refractive indices is less than 20% and preferably less than 10% for the light in the range of the re-emitted wavelengths $\lambda$. Ideally the refractive indices would be exactly the same. The desired equalization of the refractive indices can be achieved, for example, by using a polymer with a suitably high percentage of $TiO_2$ as the binder.

Additionally (and/or alternatively) use can be made of a nano-crystalline scintillator powder with particles 6 of a size that is between 1 nm and 100 nm.

Because of the equalization of the refractive indices and/or the use of nano-particles for the construction of the X-ray detector module 1, it can be ensured that an essential part of the luminescence light can be coupled out from a cell 4 (pixel) to the detector 5, so that an adequate signal is obtained at the detector.

In a further embodiment of the X-ray detector module in accordance with the invention, as shown in FIG. 2, the walls or grid segments 3 of the carrier that separate the cells 4 from one another may also be given a greater height h', so that in the upwards direction they extend beyond the filling that consists of the scintillator material 6, 7. The projecting part 3' of the grid walls 3 would then act as an anti-scatter grid, which means that X-rays that are incident at an angle are absorbed and only the radiation that is incident essentially parallel to the walls can reach the scintillator material. Such a raised configuration of the grid segments simply results in a combination of a scintillator and an anti-scatter grid wherein exact association in space of the two elements is ensured.

What is claimed is:

1. An X-ray detector module (1) which includes a carrier (3) that forms cells (4) arranged in the form of a grid and is made of a material that is essentially non-transparent to X-rays, wherein a mass of scintillator particles (6), having a grain size in the range of between 1 nm and 50 nm, that are embedded in a binder (7) and emit light in the range of a longer wavelength $\lambda$ in response to the absorption of X-rays is provided in the cells (4), and wherein the difference between the refractive index of the scintillator particles (6) and the refractive index of the binder (7) for the wavelength $\lambda$ amounts to less than 20% and preferably less than 10%.

2. An X-ray detector module as claimed in claim 1, characterized in that the binder contains $TiO_2$, notably in the form of rutile or anatase and/or a component of ZnO, ZnS, $ZrO_2$, $BaSO_4$ and/or $PbCO_3$.

3. An X-ray detector module as claimed in claim 1, characterized in that the carrier (3) consists of a metal, of a synthetic material that is filled with a metal and/or of glass that can be photostructured.

4. An X-ray detector module as claimed in claim 1, characterized in that the surface of the carrier (3) is provided at least partly with a reflector layer (2) which has a degree of reflection of more than 90% for the light in the range of the wavelength $\lambda$.

5. An X-ray detector module as claimed in claim 1, characterized in that the volume of the scintillator particles (6) amounts to from 50% to 70% of the volume of the mass that is provided in the cells (4).

6. An X-ray detector module as claimed in claim 1, characterized in that the height (h) of the mass embedded in the cells (4) amounts to from 0.1 mm to 5 mm.

7. An X-ray detector module as claimed in claim 1, characterized in that the width (b) as measured in the plane of the array of the cells (4) is smaller than the height (h) of the cells.

8. An X-ray detector module as claimed in claim 1, characterized in that the scintillator particles (6) contain rare earth oxide or oxisulphides with Pr, Ce, Tb and/or Eu as a doping material, notably $Gd_2O_2S$:Pr or $Gd_2(SO_4)O$:Ce, and/or alkali halides such as CsI:Tl, CsI:Na or NaI:Tl and/or $CdWO_4$.

9. An X-ray detector module as claimed in claim 1, characterized in that to one side of at least one cell (4) there is provided a detector (5) for converting photons from the range of the longer wavelength $\lambda$ into an electrical signal.

10. An X-ray detector module as claimed in claim 1, which detector module includes a carrier (3, 3') that forms cells (4) arranged in the form of a grid and consists of a material that is essentially non-transparent to X-rays, wherein the cells (4) have a tubular shape and only a sub-volume of the cells contains a scintillator material (6, 7).

11. A method of manufacturing an X-ray detector module (1) as claimed in claim 1, where a free-flowing mixture of a binder (7) and scintillator particles (6) is deposited at least once in the cells (4) of a carrier (3), subsequently, the mixture is densified by thermal treatment and/or by UV irradiation.

* * * * *